US012403558B2

(12) United States Patent
Petersen et al.

(10) Patent No.: US 12,403,558 B2
(45) Date of Patent: Sep. 2, 2025

(54) GRINDING TOOL FOR GRINDING A LEADING EDGE OF A WIND TURBINE BLADE

(71) Applicant: Vestas Wind Systems A/S, Aarhus N (DK)

(72) Inventors: Aksel Petersen, Rinkøbing (DK); Bjarne Korshøj Mathiasen, Skjern (DK)

(73) Assignee: Vestas Wind Systems A/S, Aarhus N. (DK)

( * ) Notice: Subject to any disclaimer, the term of this patent is extended or adjusted under 35 U.S.C. 154(b) by 266 days.

(21) Appl. No.: 17/766,844

(22) PCT Filed: Oct. 5, 2020

(86) PCT No.: PCT/DK2020/050270
§ 371 (c)(1),
(2) Date: Apr. 6, 2022

(87) PCT Pub. No.: WO2021/069039
PCT Pub. Date: Apr. 15, 2021

(65) Prior Publication Data
US 2024/0058920 A1 Feb. 22, 2024

(30) Foreign Application Priority Data
Oct. 7, 2019 (DK) .......................... PA 2019 70626

(51) Int. Cl.
*B24B 21/16* (2006.01)
*F03D 13/30* (2016.01)

(52) U.S. Cl.
CPC ............ *B24B 21/165* (2013.01); *F03D 13/30* (2016.05); *F05B 2230/90* (2013.01); *F05B 2240/303* (2020.08)

(58) Field of Classification Search
CPC ....... B24B 21/16; B24B 21/165; B24B 49/16; B24B 21/006; B24B 55/075;
(Continued)

(56) References Cited

U.S. PATENT DOCUMENTS 3,969,848 A * 7/1976 DeMusis ............... B24B 21/165
451/305
2009/0249623 A1 10/2009 Holze et al.
(Continued)

FOREIGN PATENT DOCUMENTS

CN 104781043 A 7/2015
DE 8903246 U1 5/1989
(Continued)

OTHER PUBLICATIONS

Danish Patent and Trademark Office, Search and Examination Report in PA 2019 70626, Mar. 24, 2020.
(Continued)

*Primary Examiner* — Brian D Keller
*Assistant Examiner* — John C Merino
(74) *Attorney, Agent, or Firm* — Wood Herron & Evans LLP (57) ABSTRACT

The invention relates to a grinding tool for grinding a leading edge of a wind turbine blade. It comprises two parallel shafts of which at least one is rotationally driven and a frame for holding the two shafts in a fixed mutual relationship. An annular abrasive belt is arranged around a tension device mounted to the frame and guides of which there is one on each of the two shafts. The abrasive belt runs in a plane perpendicular to the shafts and has a longer length than an imaginary curve formed by outer surfaces of the tension device and of the guides. The grinding tool further comprises two abrasive belt retainers movably mounted to the frame. They are shaped and arranged to move between (Continued)

a retaining position in which they retain the abrasive belt along at least parts of the abrasive belt which is in contact with the guides, and a release position in which they are out of contact with the abrasive belt.

16 Claims, 5 Drawing Sheets

(58) Field of Classification Search
CPC ....... B24B 55/107; B24B 55/08; B24B 19/14; B23Q 16/028; B23Q 5/341; B28D 5/042; B28D 5/045; Y10T 74/219; Y10T 74/2193; Y10T 409/30392
See application file for complete search history.

(56) References Cited

U.S. PATENT DOCUMENTS

2009/0258579 A1  10/2009  Joslin
2009/0275269 A1  11/2009  Sakairi
2012/0318190 A1* 12/2012  Jost .......................... B24B 55/08
                                                        451/73

FOREIGN PATENT DOCUMENTS

| DE | 102005002886 B3 | 5/2006 |
| EP | 2422929 A1 | 2/2012 |
| GB | 703796 A | 2/1954 |
| WO | 2012072085 A1 | 6/2012 |
| WO | 2013092597 A1 | 6/2013 |

OTHER PUBLICATIONS

European Patent Office, International Search Report and Written Opinion in PCT Application No. PCT/DK2020/050270, Dec. 22, 2020.

China National Intellectual Property Administration, Office Action issued in corresponding Chinese Application No. 202080081405.6. mailed Apr. 13, 2023.

* cited by examiner

GRINDING TOOL FOR GRINDING A LEADING EDGE OF A WIND TURBINE BLADE

FIELD OF THE INVENTION

The present invention relates to a grinding tool for grinding a leading edge of a wind turbine blade. Such a grinding tool can be used for performing a finishing operation on a wind turbine blade which has been manufactured in a mould comprising two mould halves. It can also be used for performing a repair on a wind turbine blade which has been influenced by wear during operation.

BACKGROUND OF THE INVENTION

Wind turbines are used to convert wind energy into electric energy. The wind acts on the wind turbine blades connected to a shaft used to drive a generator. Such wind turbine blades can be made by different manufacturing techniques, typically including moulding in a mould comprising two mould halves. Part of the connection between the mould halves may be along the leading edge of the blade, and after de-moulding, some finishing operation of the blade surface along the leading edge is typically necessary in order to ensure a desired shape of the blade which again influences the performance. Such finishing operation typically includes grinding by use of handheld polishing or vibration tools, such as brush strips, eccentric grinders, or plain grinders. This is a time consuming process which requires good skills to ensure a satisfactory result.

Furthermore, wind turbine blades experience wear during use, and in order to maintain the required performance, maintenance may be necessary in order to bring a worn blade geometry back into a desired shape. Such maintenance typically includes grinding which may be cumbersome, as it has to take place on site.

Hence, an improved grinding tool for grinding a leading edge of a wind turbine blade would be advantageous.

It is an object of the present invention to provide a grinding tool for grinding a leading edge of a wind turbine blade with which it is easier to ensure a predetermined shape of the leading edge than with the use of known techniques.

It is another object of the present invention to provide a grinding tool for grinding a leading edge of a wind turbine blade so that a finishing operation during manufacturing is made more efficient than with the use of known techniques.

It is another object of the present invention to provide a grinding tool for grinding a leading edge of a wind turbine blade with which repair of a worn leading edge is made more efficient than with the use of known techniques.

It is an object of at least some embodiments of the present invention to provide a grinding tool for grinding a leading edge of a wind turbine blade with which the service life of abrasive material used for the grinding can be prolonged compared to known techniques.

In particular, it may be seen as an object of the present invention to provide a grinding tool that solves the above mentioned problems of the prior art.

SUMMARY OF THE INVENTION

In the context of the present invention, the term "wind turbine generator" or "wind turbine" should be considered to include, but is not limited to, a wind turbine generator comprising one or more wind turbine blades which are rotatable, by action of the wind, around a horizontal axis mounted in a nacelle mounted on the uppermost part of an elongated tower. The nacelle itself is pivotal around a vertical axis in order to turn the blade into a suitable aligned position with the wind direction. The one or more blades are rotated at a speed which is dependent on the wind and the aerodynamics of the blades in order to drive a generator for converting wind energy into electric energy. In short, a wind turbine or wind turbine generator or wind generator or aero generator may be defined as a means for converting the kinetic energy of the wind into mechanical energy and, subsequently, into electric energy.

In the context of the present invention, the term "wind turbine blade", or similar wordings, should be considered to include, but is not limited to, an elongated structure having an airfoil-shaped profile suitable for providing an aerodynamic lift upon relative movement through air. The wind turbine blades may interchangeably be called "rotor blades" within the context of the present invention.

The above-described object and several other objects are intended to be obtained in a first aspect of the invention by providing a grinding tool for grinding a leading edge of a wind turbine blade, the grinding tool comprising:
  two parallel shafts of which at least one is rotationally driven when the grinding tool is in use, the shafts being parallel along at least part of their lengths,
  a frame for holding the two shafts in a fixed mutual relationship,
  a rotationally mounted tension device, such as a tension wheel, mounted on the frame, and
  an annular abrasive belt arranged around the tension device and guides of which there is one on each of the two shafts,
wherein the shafts, the tension device and the guides are arranged to guide the abrasive belt in a plane perpendicular to the parallel parts of the shafts,
wherein the two shafts are arranged so that outer surfaces of the tension device and of the guides carrying the abrasive belt form an imaginary curve being shorter than a length of the abrasive belt.

By "imaginary curve" is meant a curve which would have a shortest possible length, if it were arranged around the tension device and the guides.

An alternative to having the tension device in the form of a tension wheel could be a further shaft.

In some embodiments of the invention, the grinding tool further comprises two abrasive belt retainers movably mounted to the frame, the abrasive belt retainers being shaped and arranged to move between:
  a retaining position in which they retain the abrasive belt along at least parts of the abrasive belt which is in contact with the guides, and
  a release position in which they are out of contact with the abrasive belt. Such abrasive belt retainers will facilitate the use of the grinding tool, because the abrasive belt is retained in the correct engagement with the guides so that the user of the grinding tool does not have to take care of the arrangement of the abrasive belt in the guides as part of the grinding operation.

As mentioned above, the two shafts are arranged so that outer surfaces of the tension device and of the guides carrying the abrasive belt form an imaginary curve being shorter than a length of the abrasive belt. This means that when the grinding tool is not in use, the abrasive belt is slack. The abrasive belt retainers are used to ensure that the abrasive belt is kept in the correct position ready for use.

The two shafts may be parallel along their whole length as will be the case in the embodiments shown in the figures.

However, in embodiments where one of the shafts is not driven, this non-driven shaft could have another orientation along part of the length not carrying the guide. It could e.g. be curved or bent towards the frame. It could also be integrated with the frame. Furthermore, the shafts need not have a constant cross-section along the whole of their lengths.

The design of the grinding tool, including the fixed mutual relationship between the two shafts and the arrangement of the tension device, means that for a given length of the abrasive belt, a resulting predetermined angle is obtained between straight parts of the abrasive belt between the guides irrespective of the radius of curvature of the leading edge; this will be illustrated in the figures. Hereby a corresponding predetermined shape of a leading edge being ground by the grinding tool can be ensured. If a different predetermined angle is desired, this can be obtained by changing to an abrasive belt having another length. An advantage of the present invention is that the same tool can be used to perform the grinding from the very tip of the blade to the root end because the abrasive belt adapts to the varying radius of curvature of the cross-section of the leading edge.

The abrasive belt retainers may be shaped so that when they are in the retaining position, they extend over such parts of the abrasive belt such that the abrasive belt curves in opposite directions between the abrasive belt retainers and around the guides.

An advantage of the change of curvature of the abrasive belt when moving from the grinding location to passing around the following guide is that debris from the grinding is automatically removed from the abrasive belt so that the service life is significantly prolonged compared to the traditionally used grinding discs.

A motor for driving the driven shaft can be powered by a battery or by a cable connected to an external power supply. Such a motor may be part of the grinding tool but could also be an external device with which the driven shaft can be connected.

In some embodiments of the invention, one of the shafts is non-driven and fixedly mounted in the frame, and the guide thereon is rotationally mounted, such as bearing supported.

In alternative embodiments where one of the shafts is non-driven, this shaft may be rotationally mounted in the frame, such as bearing supported, and the guide thereon may be fixedly mounted or be in the form of a recess in the shaft. The different options give more freedom to the design of the tool.

In some embodiments of the invention, the grinding tool comprises a plurality of abrasive belts and a corresponding number of guides, tension devices, and abrasive belt retainers; the plurality of abrasive belts are arranged in consecutive grinding planes along the shafts; and the tension devices apply a biasing tensioning force to the abrasive belts. The tension devices may be mounted on individual lever arms that are used to apply the biasing tensioning force. By "corresponding number" is meant a number matching the number of abrasive belts with reference to the above given description of one abrasive belt. E.g. for each abrasive belt there are two guides, one guide on each shaft. When there is more than one abrasive belt and thereby more than one guide on each shaft, these guides may be individual components. However, the scope of protection also covers embodiment in which a series of guides is provided as a unitary element.

In embodiments of the invention having a plurality of abrasive belts and being designed as just described, the plurality of abrasive belts may have at least two different grit coarsenesses, and may have the grit coarseness increasing along a length direction of the shafts.

"Grit coarseness" refers to how coarse the abrasive belt is, and it is related to the amount of material being removed from a surface being ground as well as the resulting roughness; the exact measures being dependent on e.g. material and applied pressure. Grit coarseness can also be referred to as grit size which refers to the size of the particles of abrading materials embedded in the sandpaper of the abrasive belt. Several standards have been established for grit size. These standards establish not only the average grit size, but also the allowable variation from the average. The two most common are the United States CAMI (Coated Abrasive Manufacturers Institute and the European FEPA (Federation of European Producers of Abrasives) "P" grade. The FEPA system is the same as the ISO 6344 standard.

By using a plurality of abrasive belts of increasing grit coarseness, it is possible to obtain an efficient grinding process. When the grinding tool is moved along a leading edge, a specific portion thereof is subjected to grinding by subsequent abrasive belts of decreasing coarseness. Hereby the process will in one working operation resemble the traditionally necessary multiple steps of grinding with abrasive tools, such as grinding discs, each having one grit coarseness.

In embodiments of the invention having a plurality of abrasive belts and being designed as described above, the shafts may be first and second driven shafts, and during use of the grinding tool, some of the abrasive belts may run clockwise and some of the abrasive belts may run counter-clockwise. This may e.g. be obtained by the abrasive belts that run clockwise being driven by the first driven shaft and guided by bearing supported guides on the second shaft, and the abrasive belts that run counter-clockwise being driven by the second driven shaft and guided by bearing supported guides on the first shaft. An example of such an embodiment will be illustrated in the figures.

The abrasive belts running clockwise may alternate with abrasive belts running counter-clockwise. Hereby the forces from the grinding process may be more evenly distributed so that it is easier to manually handle the grinding tool making it easier to apply an even pressure and thereby obtain an even ground surface on the leading edge.

In a grinding tool as in any of the embodiments described above, the at least one driven shaft may comprise a connection for engagement with an external driving device for driving the at least one driven shaft. Hereby the grinding tool need not include its own motor and battery. Such external driving device could e.g. form part of an automatic device used to perform the grinding.

The frame of a grinding tool in any of the embodiments described above may comprise a removable end plate arranged at an end of the shafts so that the abrasive belt(s) can be replaced after removal of the end plate. Such replacement could be necessary due to wear of the abrasive belts. It could also be to use abrasive belts of another length in order to obtain another final geometry of the leading edge being ground by the tool.

In some embodiments of the invention, the grinding tool is adapted to be handheld during use. In alternative embodiments, the grinding tool is adapted to form part of an automatic device, such a grinding robot. It may also be possible to have one grinding tool which can be either handheld or forming part of an automatic device depending on the actual needs, such as the amount of grinding work to be performed.

A second aspect of the invention relates to a method of grinding a leading edge of a wind turbine blade by use of a grinding tool according to any of the preceding claims, the method comprising the following steps:
- presenting the abrasive belt(s) of the grinding tool to the leading edge to be ground,
- applying a pushing force by pressing the abrasive belt(s) towards and past the leading edge,
- rotating the abrasive belt(s) and thereby grinding the leading edge, and
- moving the grinding tool along the leading edge while maintaining the pushing force.

In some embodiments of the invention, the rotating of the abrasive belt(s) will be obtained by the pushing force leading to a sufficient tensioning of the abrasive belt(s) to make the friction between the abrasive belt(s) and the underlying surfaces transfer the rotation of the at least one driven shaft to the abrasive belt(s). In alternative embodiments, the rotation of the abrasive belt(s) may be initiated before the grinding tool is pushed against the leading edge.

A third aspect of the invention relates to the use of a method according to the second aspect of the invention for performing a finishing operation on a wind turbine blade which has been manufactured in a mould comprising two mould halves. Such a manufacturing method results in the need for a finishing operation in order to remove possible excess material and make sure that the leading edge has a smooth and predefined desired geometry. The present invention has made this finishing process more efficient and made it easier to ensure a desired geometry in one working process. Should further final polishing be necessary, this can potentially be done by use of a traditionally used polishing or vibration tools, such as brush strips, eccentric grinders, or plain grinders.

A third aspect of the invention alternatively relates to the use of a method according to the second aspect of the invention for performing a repairing operation on a wind turbine blade which has been influenced by wear during operation.

The first, second and third aspects of the present invention may each be combined with any of the other aspects. These and other aspects of the invention will be apparent from and elucidated with reference to the embodiments described hereinafter.

BRIEF DESCRIPTION OF THE FIGURES

The grinding tool according to the invention will now be described in more detail with regard to the accompanying figures. The figures show one way of implementing the present invention and is not to be construed as being limiting to other possible embodiments falling within the scope of the attached claim set.

FIGS. 2.a and 2.b shows schematically the abrasive belt retainers in the retaining position and the release position, respectively.

FIGS. 3.a and 3.b shows schematically how the angle of the abrasive belt between the two guides can be changed by changing to abrasive belts with another length.

DETAILED DESCRIPTION OF AN EMBODIMENT

Figure 1:
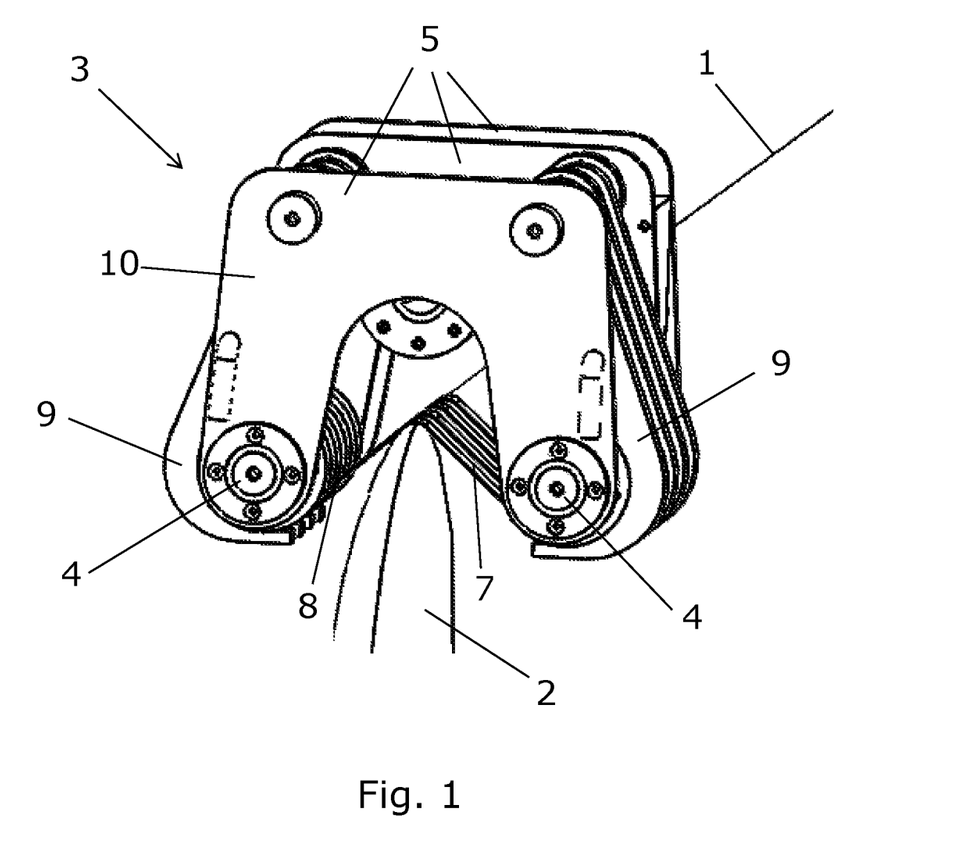
FIG. 1 shows schematically a grinding tool during grinding.
Figure 2:
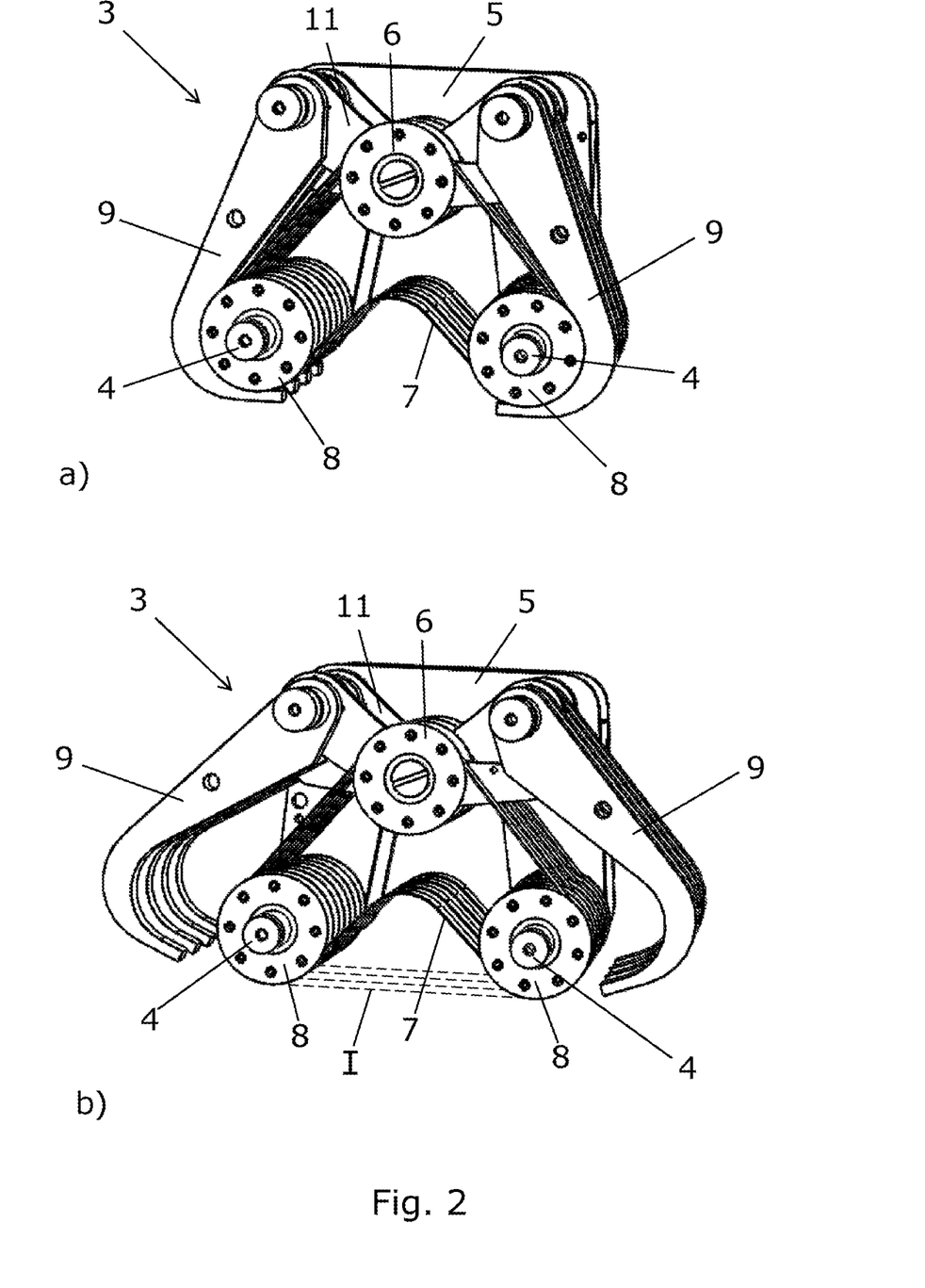

FIG. 1 shows schematically an example of a grinding tool 3 for grinding a leading edge 1 of a wind turbine blade 2. The grinding tool 3 comprises two parallel shafts 4 of which at least one is rotationally driven when the grinding tool 3 is in use. The shafts 4 of the illustrated embodiments are parallel along the whole of their lengths. The grinding tool 3 has a frame 5 for holding the two shafts 4 in a fixed mutual relationship; this frame 5 may differ from the illustrated design. In the illustrated embodiments, the tension device is in the form of a tension wheel 6 that is mounted on the frame 5 and used to apply a tensioning force to the abrasive belt 7 as will be explained below. The embodiment in FIG. 2 comprises four annular abrasive belts 7 each arranged around a tension wheel 6 and two guides 8 of which there is one for each abrasive belt 7 on each of the two shafts 4. The shafts 4, the tension wheels 6 and the guides 8 are dimensioned, shaped and arranged to guide the abrasive belts 7 in successive planes perpendicular to the shafts 4. The two shafts 4 are arranged so that for each abrasive belt 7, the outer surfaces of the tension wheel 6 and of the guides 8 carrying the abrasive belt 7 form an imaginary curve I being shorter than a length of the abrasive belt 7. Hereby it is obtained that the abrasive belts 7 can be arranged over the leading edge 1 to perform the grinding over the leading edge 1 when the grinding tool 3 is forced downwards with the orientation of the wind turbine blade 2 being as shown in FIG. 2. The grinding tool 3 is pressed past the leading edge 1 until the abrasive belts 7 start to rotate and thereby grind the leading edge 1. The grinding can also be performed with the wind turbine blade 2 in other orientations, such as horizontal.

As also shown for the embodiment in FIG. 1, for each abrasive belt 7, the grinding tool 3 comprises two abrasive belt retainers 9 movably mounted to the frame 5. However, it would also be possible to have one abrasive belt retainer 9 associated with more than one abrasive belt 7, e.g. to limit the number of movable parts. As shown schematically in FIG. 2, the abrasive belt retainers 9 are shaped and arranged to move between a retaining position shown in FIG. 2.a in which they retain the abrasive belts 7 along parts of the abrasive belt which are in contact with the guides 8, and a release position as shown in FIG. 2.b in which the abrasive belt retainers 9 are out of contact with the abrasive belts 7. For the illustrated embodiment of FIG. 1, the frame 5 comprises a removable end plate 10 arranged at an end of the shafts 4 so that the abrasive belts 7 can be replaced after removal of the end plate 10 and with the abrasive belt retainers 9 in the release position. This end plate 10 has been removed in FIG. 2 to show more clearly the other components. In the figures, the abrasive belt retainers 9 are in the form of curved bars hingedly connected to the frame 5, but any geometry fulfilling the function of releasably retaining the abrasive belts 7 are covered by the scope of the invention.

The abrasive belt retainers 9 are shaped so that when they are in the retaining position, they extend over such parts of the abrasive belts 7 that the abrasive belts 7 curve in opposite directions between the abrasive belt retainers 9 and around the guides 4 as shown in the figures. As also shown, this means that the shape of the abrasive belts 7 obtains an apex in the region which is to be arranged on the leading edge 1 during use of the grinding tool 3. Hereby it will be easier to handle the grinding tool. The abrasive belt retainers 9 preferably have a shape which is complementary to the outer surface of the guides 4 so that the abrasive belts 7 are securely held in place also when the abrasive belts 7 are slack before use.

The abrasive belts 7 will typically have sufficient stiffness to remain substantially in the illustrated shape also when the grinding tool 3 is not in engagement with the leading edge 1. However, even if the abrasive belts 7 have less stiffness so that they hang downwards between the points of support, they will be retained in the guides 4 due to the shape of the abrasive belt retainers 9. As mentioned above, an advantage of the change of curvature of the abrasive belts 7 when moving from the grinding location at the leading edge 1 to passing around the following guide 4 is that debris from the grinding is automatically removed from the abrasive belts 7 so that the service life is significantly prolonged compared to grinding discs.

Figure 3:
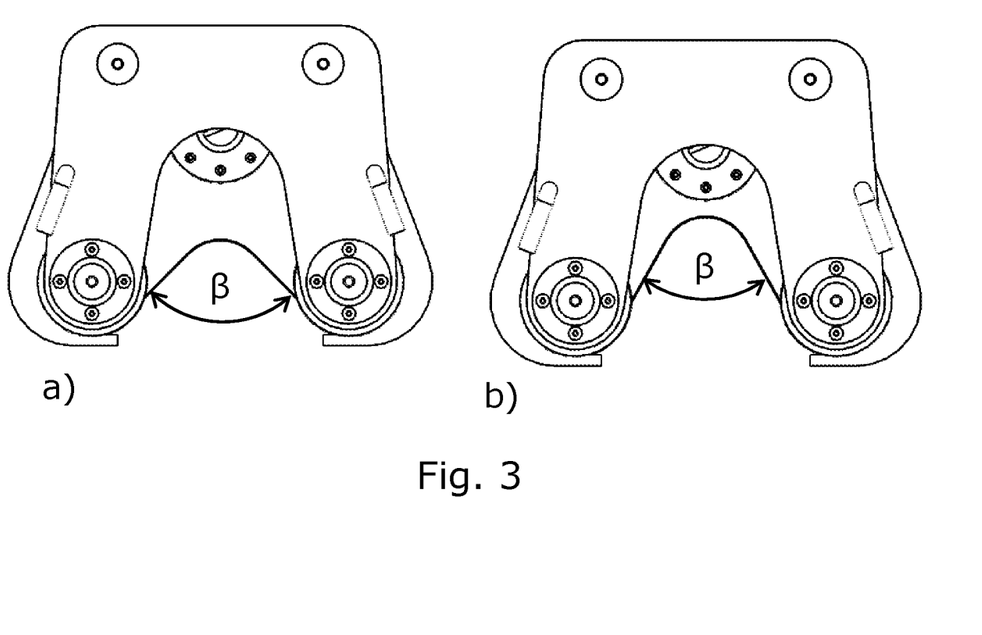

The design of the grinding tool 3, including the fixed mutual relationship between the two shafts 4 and the position of the tension device 6 related to the biasing force applied by the lever arm, see below, means that for a given length of the abrasive belt 7, a resulting predetermined angle $\beta$ is obtained between straight parts of the abrasive belt 7 between the guides 4 irrespective of the radius of curvature of the leading edge 1. FIG. 3.a shows an example wherein the angle $\beta$ is 90°, and FIG. 3.b shows an example wherein the abrasive belts 7 are longer resulting in a smaller angle $\beta$. Hereby a predetermined radius of curvature of a leading edge 1 being ground by the grinding tool 3 can be ensured by choosing a specific length of the abrasive belts 7 which for a given design of a grinding tool results in a predetermined angle $\beta$.

By comparing FIGS. 1 and 3.a, it can be seen that for a given grinding tool 3 and a given length of the abrasive belts 7, the angle will be independent on the radius of curvature of the cross-section of the leading edge 1.

Figure 4:
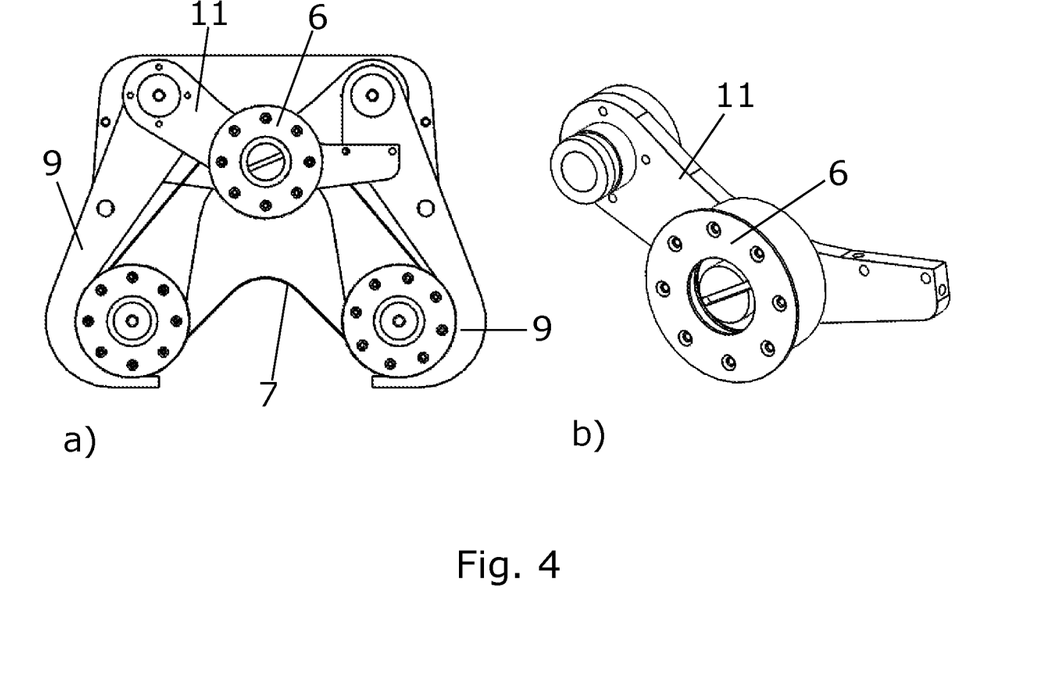
FIG. 4 shows schematically a grinding tool with the end plate removed to reveal the lever arm carrying the tension wheel.

In embodiments of the invention having a plurality of abrasive belts 7, the tension wheels 6 are preferably mounted on individual lever arms 11 applying a biasing tensioning force to the respective abrasive belts 7. Such biasing is typically obtained by use of springs (not shown). FIG. 4.a shows how the tension wheels 11 are mounted on lever arms 11 that with the illustrated orientation apply an upwards force to the abrasive belts 7. FIG. 4.b shows the geometry of a lever arm 11 in FIG. 4.a with the tensioning wheel 6 mounted thereto. By having the lever arms 11 applying tensioning forces individually to each of the abrasive belts 7, it is ensured that all the abrasive belts 7 perform a grinding operation also when the overall geometry of the wind turbine blade 2 varies along the longitudinal direction of the blade 2. When the grinding takes place near the tip of the blade so that not all the abrasive belts are in engagement with the leading edge 1, the remaining abrasive belts 7 will still be kept with the desired tension. Furthermore, the individual application of the tensioning will counteract any variations in lengths between the abrasive belts 7.

Figure 5:
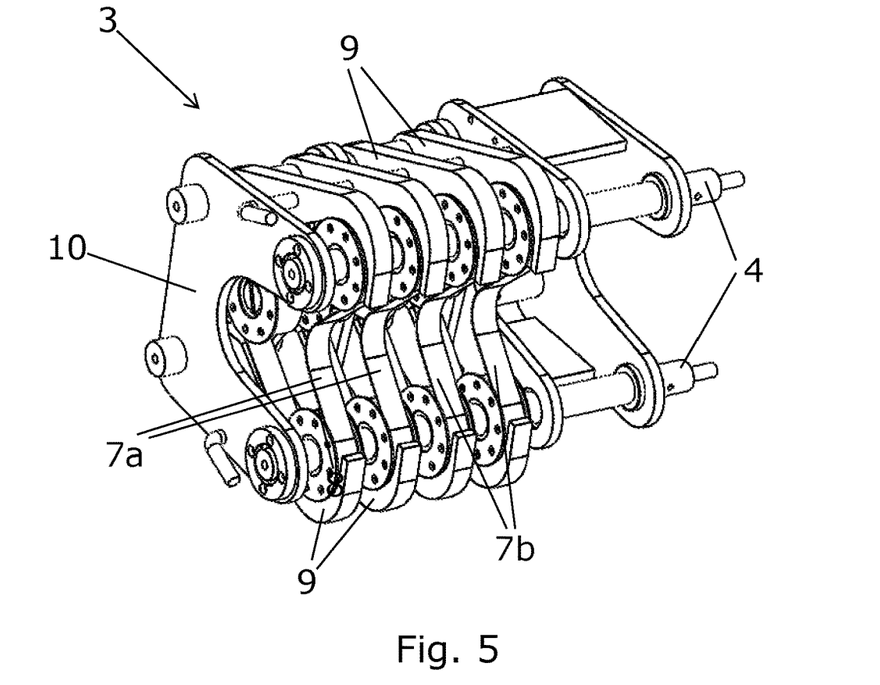
FIG. 5 shows schematically a three-dimensional view of a grinding tool with four abrasive belts having two different grit coarsenesses.

FIG. 5 shows the grinding tool 3 of the previous figures from another angle to illustrate more clearly how the abrasive belt retainers 9 engage with each of the abrasive belts 7 to keep them in place in the guides. The abrasive belts in FIG. 5 have two different grit coarsenesses shown schematically with two different reference numbers 7a and 7b.

When the grinding tool 3 is moved along a leading edge 1, a specific portion thereof is subjected to a grinding by subsequent abrasive belts 7 of decreasing coarseness. Hereby the process will in one working operation resemble the traditionally necessary multiple steps of grinding with abrasive tools, such as grinding discs, each having one grit coarseness.

Figure 6:
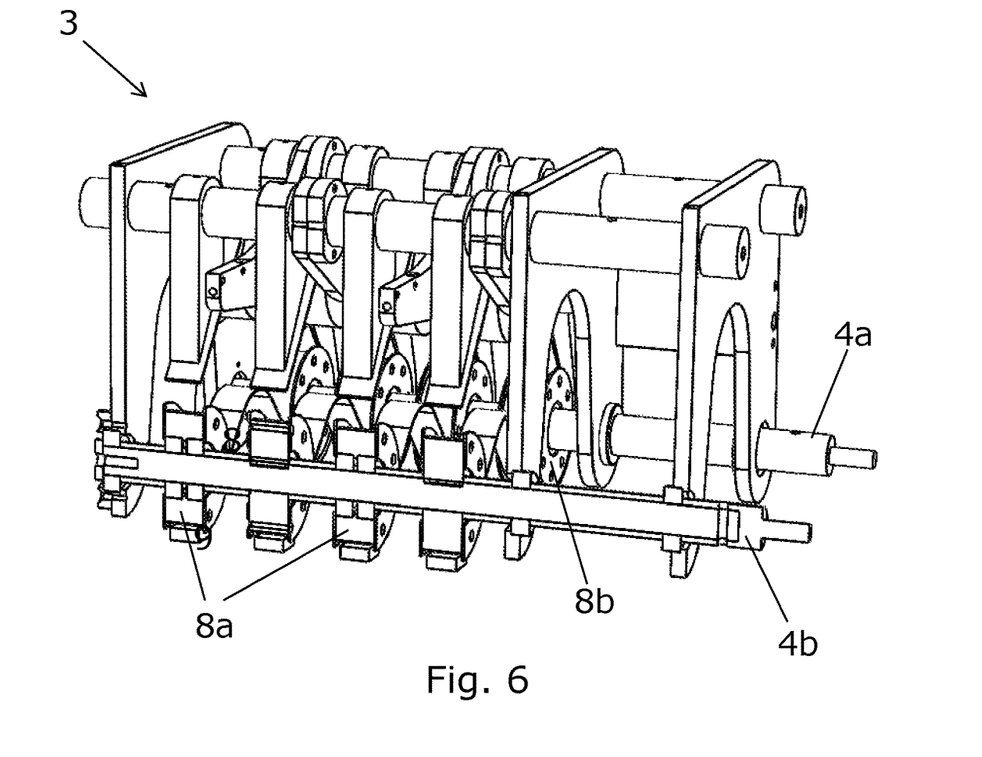
FIG. 6 shows schematically a three-dimensional view of a grinding tool with two driven shafts of which one is shown in cross-sectional view.

FIG. 6 shows a grinding tool 3 wherein the shafts 4 are first and second driven shafts 4a, 4b. During use of the grinding tool 3, some of the abrasive belts 7 run clockwise driven by the first driven shaft 4a and guided by bearing supported guides on the second shaft 8a, and some of the abrasive belts 7 run counter-clockwise driven by the second driven shaft 4b and guided by bearing supported guides 8b on the first shaft 4a. The second shaft 4b is shown in cross-sectional view to show more clearly the mounting in bearings and fixed mounting, respectively.

Figure 7:
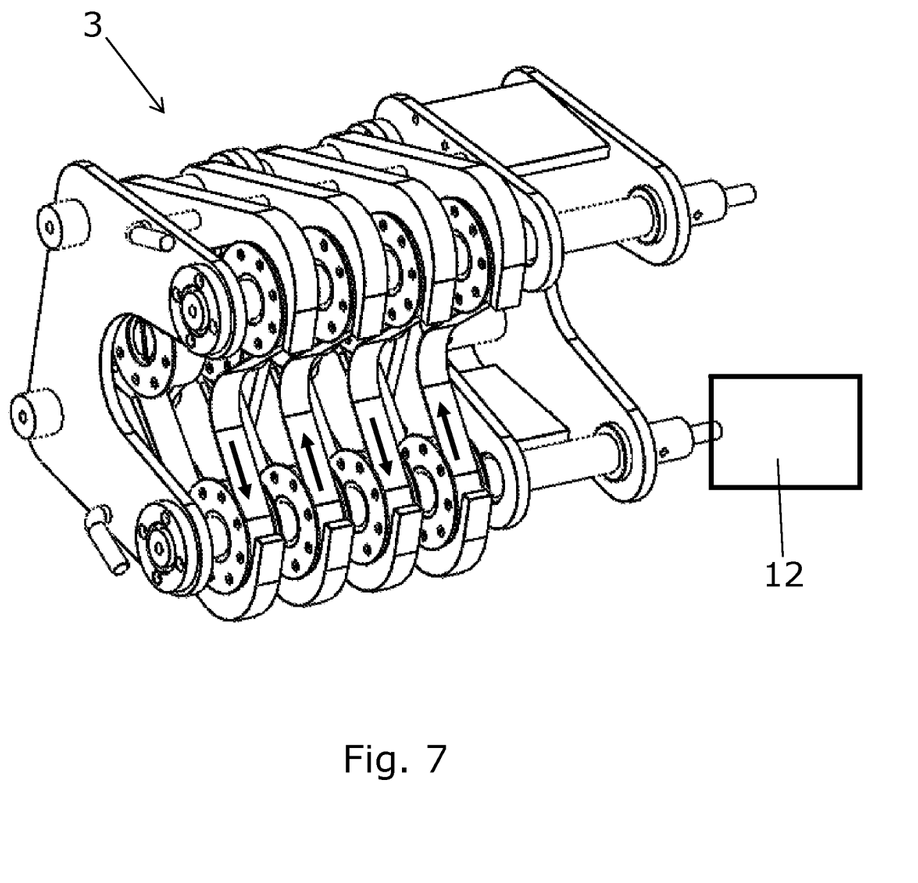
FIG. 7 shows schematically a three-dimensional view of a grinding tool with four abrasive belts arranged to run in alternating rotational directions.

In such embodiments with two driven shafts 4a,4b, the abrasive belts 7 running clockwise preferably alternate with abrasive belts 7 running counter-clockwise as shown schematically in FIG. 7. The two different rotational directions are illustrated by the abrasive belts 7 being provided with arrows in the figure.

In some embodiments of the invention, the grinding tool 3 comprises a motor (not shown) which may be powered by a built-in battery. This may be preferred for grinding tools 3 that are adapted to be handheld during use. Alternatively, the at least one driven shaft 4 may comprise a connection or engagement with an external driving device for driving the at least one driven shaft. Such an external driving device is shown schematically in FIG. 7 as a box 12. It may e.g. be an automatic device, such a grinding robot, to which the grinding tool 3 can be connected.

The use of a grinding tool 3 as described above typically comprises the following steps:
  presenting the abrasive belt(s) of the grinding tool 3 to the leading edge 1 to be ground,
  applying a pushing force by pressing the abrasive belt(s) 7 towards and past the leading edge 1 until the abrasive belt(s) 7 start(s) to rotate and thereby grind the leading edge 1,
  moving the grinding tool 3 along the leading edge 1 while maintaining the pushing force.

Although the present invention has been described in connection with the specified embodiments, it should not be construed as being in any way limited to the presented examples. The scope of the present invention is set out by the accompanying claim set. In the context of the claims, the terms "comprising" or "comprises" do not exclude other possible elements or steps. Furthermore, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

The invention claimed is:

1. A grinding tool for grinding a leading edge of a wind turbine blade, the grinding tool comprising:
  two parallel shafts of which at least one is rotationally driven when the grinding tool is in use, the shafts being parallel along at least part of their lengths;

at least one guide on each of the two shafts;
a frame for holding the two shafts in a fixed mutual relationship;
at least one rotationally mounted tension device mounted on the frame;
at least one annular abrasive belt arranged around the at least one tension device and the at least one guide on each of the two shafts; and
at least two abrasive belt retainers movably mounted to the frame, each of the at least two abrasive belt retainers being shaped and arranged to move between:
a retaining position in which the at least two abrasive belt retainers retain the at least one abrasive belt along at least parts of the at least one abrasive belt which is in contact with the at least one guide on each of the two shafts; and
a release position in which the at least two abrasive belt retainers are out of contact with the at least one abrasive belt;
wherein the two shafts, the at least one tension device, and the at least one guide on each of the two shafts are arranged to guide the at least one abrasive belt in a plane perpendicular to the parallel parts of the two shafts;
wherein the two shafts are arranged so that outer surfaces of the at least one tension device and of the at least one guide on each of the two shafts carrying the at least one abrasive belt form an imaginary curve being shorter than a length of the abrasive belt; and
wherein a portion of the at least one abrasive belt between the at least one guide on each of the shafts defines a grinding portion configured to engage with the leading edge of the wind turbine blade, and wherein the grinding portion of the at least one abrasive belt extends in free space without contact with other components of the grinding tool.

2. The grinding tool according claim 1, wherein each of the at least two abrasive belt retainers is shaped so that in the retaining position, each of the at least two abrasive belt retainers extends over such parts of the at least one abrasive belt such that the at least one abrasive belt curves in opposite directions between the at least two abrasive belt retainers and around the at least one guide on each of the two shafts.

3. The grinding tool according to claim 1, wherein:
one of the two shafts is non-driven and fixedly mounted in the frame, and the at least one guide thereon is rotationally mounted, or
one of the two shafts is non-driven and rotationally mounted in the frame and the at least one guide thereon is fixedly mounted or is in the form of a recess in the one of the two shafts.

4. The grinding tool according to claim 1, wherein:
the grinding tool comprises a plurality of abrasive belts and a corresponding number of plurality of guides on each of the two shafts, plurality of tension devices, and a plurality of pairs of abrasive belt retainers,
the plurality of abrasive belts is arranged in consecutive grinding planes along the two shafts, and
each of the plurality of tension devices apply a biasing tensioning force to a respective one of the plurality of abrasive belts.

5. The grinding tool according to claim 4, wherein the each of the plurality of tension devices is mounted on an individual lever arm that is used to apply the biasing tensioning force.

6. The grinding tool according to claim 4, wherein the plurality of abrasive belts have at least two different grit coarsenesses, and wherein the grit coarseness increases along a length direction of the two shafts.

7. The grinding tool according to claim 4, wherein the two shafts are first and second driven shafts, and wherein during use of the grinding tool, some of the plurality of abrasive belts run clockwise and some of the plurality of abrasive belts run counter-clockwise.

8. The grinding tool according to claim 7, wherein the some of the plurality of abrasive belts running clockwise alternate with the some of the plurality of abrasive belts running counter-clockwise.

9. The grinding tool according to claim 1, wherein the at least one driven shaft comprises a connection for engagement with an external driving device for driving the at least one driven shaft.

10. The grinding tool according to claim 1, wherein the frame comprises a removable end plate arranged at an end of the two shafts so that the at least one abrasive belt can be replaced after removal of the end plate.

11. The grinding tool according to claim 1, wherein the grinding tool is adapted to be handheld during use.

12. The grinding tool according to claim 1, wherein the grinding tool is adapted to form part of an automatic device.

13. A method of grinding a leading edge of a wind turbine blade by use of a grinding tool according to claim 1, the method comprising the following steps:
presenting the at least one abrasive belt of the grinding tool to the leading edge to be ground,
applying a pushing force by pressing the at least one abrasive belt towards and past the leading edge,
rotating the at least one abrasive belt and thereby grinding the leading edge, and
moving the grinding tool along the leading edge while maintaining the pushing force.

14. The method according to claim 13 for performing a finishing operation on a wind turbine blade which has been manufactured in a mould comprising two mould halves.

15. The method according to claim 13 for performing a repairing operation on a wind turbine blade which has been influenced by wear during operation.

16. The grinding tool according to claim 1, wherein the grinding tool is configured to be pushed against the leading edge of the wind turbine blade in a first direction and moved along the leading edge of the wind turbine blade in a second direction different than the first direction.

* * * * *